United States Patent [19]

Simmons

[11] Patent Number: 4,832,179

[45] Date of Patent: May 23, 1989

[54] CONVEYOR SYSTEMS

[75] Inventor: Robert J. Simmons, Cymbran, Great Britain

[73] Assignee: Burtons Gold Medal Biscuits Limited, Cymbran, Wales

[21] Appl. No.: 72,562

[22] Filed: Jul. 13, 1987

[30] Foreign Application Priority Data

Jul. 26, 1986 [GB] United Kingdom ............... 8618309
Apr. 3, 1987 [GB] United Kingdom ............... 8707997

[51] Int. Cl.$^4$ ............................................. B65G 47/31
[52] U.S. Cl. .................................. 198/461; 198/817; 414/798.9; 271/151; 271/185; 271/216
[58] Field of Search ............. 198/461, 607, 817, 416; 414/125, 130, 330; 271/69, 151, 184, 185, 216

[56] References Cited

U.S. PATENT DOCUMENTS

| | | | |
|---|---|---|---|
| 2,813,617 | 11/1957 | Sheetz | 198/817 |
| 3,057,453 | 10/1962 | McAlphine et al. | 198/416 |
| 3,273,691 | 9/1966 | Griner | 198/461 |
| 4,022,332 | 5/1977 | Freakes et al. | 414/330 |
| 4,085,563 | 4/1978 | Egee et al. | 198/461 |

*Primary Examiner*—Joseph E. Valenza
*Attorney, Agent, or Firm*—Scrivener and Clarke

[57] ABSTRACT

A conveyor system for conveying relatively planar articles, e.g. biscuits, comprises a first conveyor comprising a pair of runs of endless belts having operative surfaces defining a first path for biscuits. The operative surfaces of the belts face one another and are symmetrically inclined to the vertical, biscuits being conveyed thereby contacting the belts by their peripheries, and, when at least two biscuits are in contact, assuming an inclined attitude with the upper part of each biscuit leading. A further conveyor providing a further path for biscuits extends upwardly from the outlet end of the first path and, in the region of the outlet end of the first path, means are provided for causing or permitting a change in attitude of the biscuits to bring them to an attitude in which they are substantially parallel to the further path. The attitude changing means may comprise a member extending into a lower part of the first path to be contacted by biscuits as they approach the outlet end of the first path and/or an end portion of the first conveyor in which portion the angle between the belt runs is increased, and the attitude changing means cause or permit a reduction in the angle of inclination of the biscuits.

13 Claims, 3 Drawing Sheets

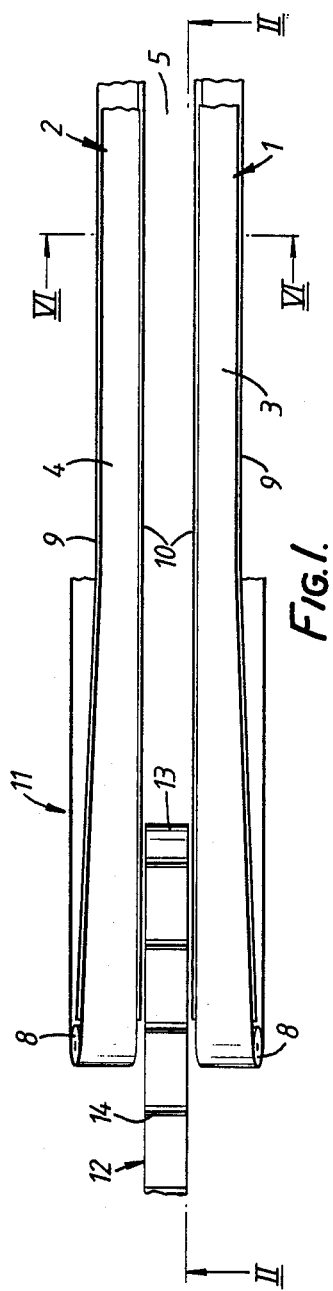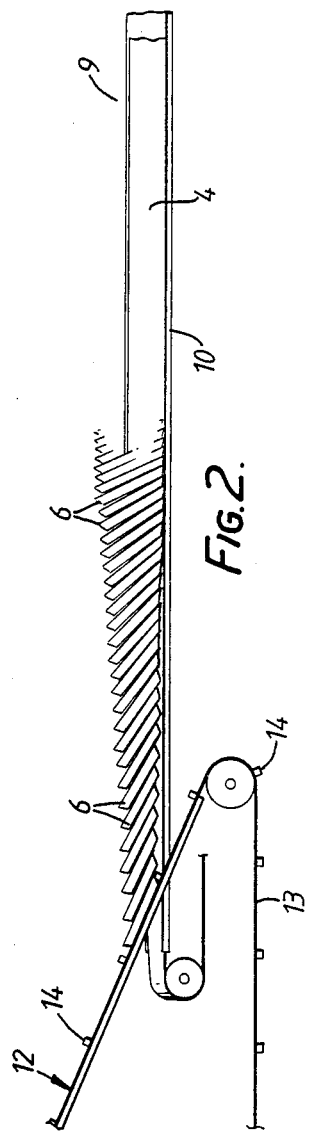

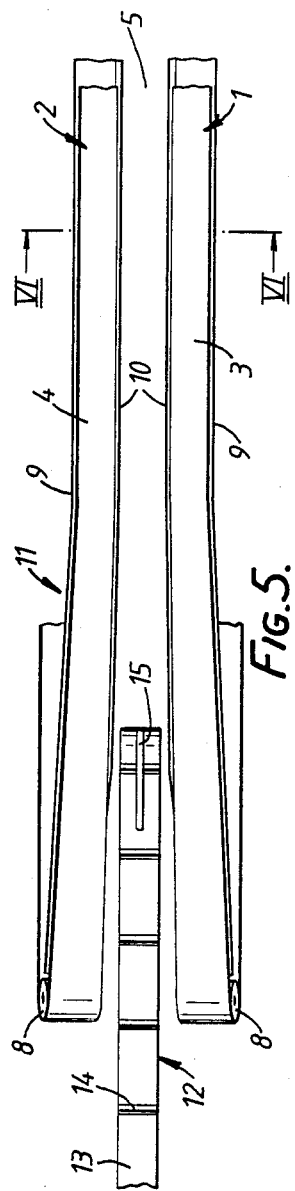
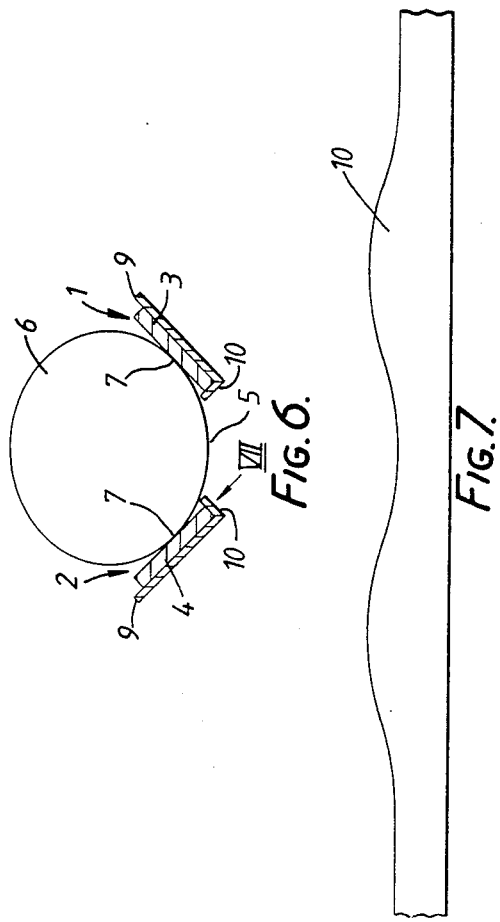
Fig. 5.
Fig. 6.
Fig. 7.

CONVEYOR SYSTEMS

The present invention concerns conveyor systems particularly but not exclusively for conveying biscuits, for example during passage from a baking station to a stacking and packing station. However, there are many other potential applications of the invention for transporting relatively planar articles of generally regular shape.

In a biscuit production line where usually a large number of fragile biscuits is conveyed, free movement of biscuits may be stopped due to an obstruction or upon reaching a point where an operation is to be carried out, or a specific spacing of succeeding biscuits or a particular rate of throughput of biscuits is required. With known conveyor systems, if the biscuit supply is reasonably steady, a stoppage results in a rapid build up of biscuits on the conveyor which results in bunching and a build-up of pressure between adjacent biscuits, a condition which biscuits are not suited to withstand. If any biscuits are out of register with adjacent biscuits, this pressure makes extraction of the misaligned biscuit by an operator difficult and can give rise to damage to that biscuit and to adjacent biscuits.

In U.K. Patent Specification No. 2170164 there is described and shown a conveyor which has proved to be very successful in overcoming this problem. The conveyor shown in U.K. Patent Specification No. 2170164 comprises a pair of parallel runs of conveyor belt defining therebetween a biscuit path. The operative faces of the runs to either side of the biscuit path face one another and are inclined to the vertical so that the lower edges of the runs are closer together than the upper edges. The runs are spaced apart and relatively inclined so that biscuits placed on the conveyor will make contact laterally with each run and, when at least two biscuits are in contact, they will assume an inclined attitude with the upper part of each biscuit leading. If the biscuits come up to an obstruction, the angle of inclination of the biscuits to the horizontal increases to bring the lower part of each biscuit into engagement with one or preferably two static supports positioned between the belt runs and on which the biscuit will be supported so that it will substantially disengage from the moving belts. Pressure will not therefore build up on the biscuits as the biscuits continue to accumulate.

In U.K. Patent Specification No. 2170164, biscuits are removed from the end of the conveyor by allowing them to move from between the belt runs onto and along a static guide which defines a downwardly inclined biscuit path so as to present the biscuits at the exit of the guide at an attitude where they are parallel to the face of a further conveyor which will removed them from the end of the guide. However, in the static guide, pressure on the biscuits increases, which is itself undesirable, and, as a result, the end biscuit being removed by the further conveyor will rub against the next succeeding biscuit and can damage it.

According to one aspect of the present invention there is provided a method of conveying relatively planar articles comprising arranging the articles on a first conveyor comprising a pair of walls which are moved in the conveying direction and have operative surfaces defining therebetween a first path for the articles, the operative surfaces facing one another and being relatively inclined to the vertical so that the lower edges of the walls are closer to each other than are the upper edges and such that an article being conveyed thereby makes contact by its periphery with the operative surfaces of the runs and, when at least two articles in the article path are in contact, assumes an inclined attitude, and reducing the angle of inclination to the horizontal of articles in the article path at the outlet end of the path.

The inclination of the articles to the horizontal towards the outlet end of the one conveyor may be decreased by increasing the included angle defined by the conveying walls in the region of the outlet end of the first path and/or by providing means contacting lower portions of the articles in the outlet end portion of the first path.

According to another aspect of the present invention there is provided a conveyor system for conveying relatively planar articles comprising a first conveyor comprising a pair of runs of endless belts having operative surfaces defining therebetween a first path for the articles, the operative surfaces facing one another and being relatively inclined to the vertical so that the lower edges of the belt runs are closer to each other than are the upper edges and such that an article conveyed thereby will make contact by its periphery with the operative surfaces of the runs and, when at least two articles in the article path are in contact, will assume an inclined attitude, and attitude changing means provided in the region of the outlet end of the article path for reducing the angle of inclination to the horizontal of articles at the outlet end of the path.

The conveyer system may include a further conveyor extending from the end of the first conveyor and defining an article path which extends upwardly therefrom and is inclined thereto, the attitude changing means being arranged to cause each article to have an inclination substantially parallel to the further article path of the further conveyor.

The attitude changing means may comprise a support means extending into the article path so as to be contacted by a portion of the periphery of an article in the first path and which causes the change in inclination of the articles. The support may extend progressively into the article path as it approaches the further conveyor so as to cause a progressive change of inclination of the article. Alternatively, the attitude changing means may comprise end portions of the belt runs, the included angle defined by the belts being increased in the end portions of the runs to permit a change in inclination of the article. The included angle of the end portions of the runs may be progressively increased in the direction of the further conveyor. It may, however, be found to be advantageous to provide both of the above described attitude changing means because, while changing the included angle of the belt runs enables the inclination of the articles to change, the support means positively causes the article inclination to change.

It may be found desirable to arrange the further conveyor so that it intersects the article path of the first conveyor and to this end the spacing of the belt runs of the first conveyor at the outlet end may be increased to accommodate the further conveyor.

The invention will be more clearly understood from the following description of embodiments thereof, given by way of example only, with reference to the accompanying drawings, in which:

FIG. 1 is a diagrammatic plan view of part of an embodiment according to the present invention;

FIG. 2 is a view of the embodiment of FIG. 1 taken on the line II—II of FIG. 1;

FIG. 5 is a diagrammatic plan view of a further embodiment according to the present invention;

FIG. 6 is a section on the line VI—VI of FIGS. 1, 3 and 5, and

FIG. 7 is an enlarged view in the direction of arrow VII showing a modification of FIG. 6.

Figure 3:
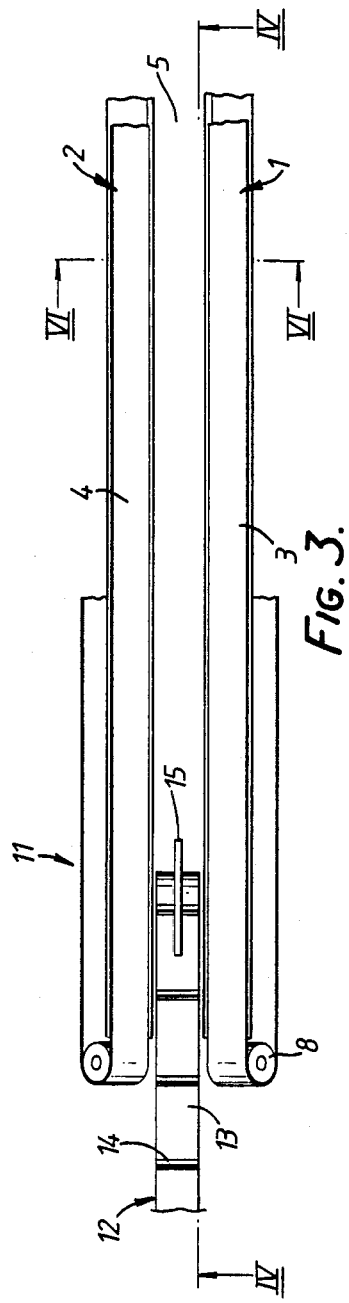
FIG. 3 is a diagrammatic plan view of another embodiment according to the present invention.

Referring now to FIGS. 1, 2 and 6, the conveyor system which, in this embodiment is designed for transporting biscuits, comprises a first conveyor comprising a pair of walls provided by runs 1, 2 of endless belts 3, 4 which define therebetween a path 5 for biscuits 6. The operative surfaces of the runs 1, 2 of the belts 3, 4 face one another and are relatively inclined to the vertical so that the lower edges are closer together than the upper edges and such that the peripheries of the biscuits 6 conveyed thereby make contact laterally at ponts 7 with each operative surface and, when at least two biscuits are in contact, assume an inclined attitude (shown in broken lines in FIG. 2) with the upper portion of the biscuit leading the lower portions trailing.

The belts 3, 4 at both ends of the runs 1, 2 extend over end pulleys, of which only pulleys 8 at the outlet end of the runs are shown and which are appropriately inclined to the vertical, and around drive and idler pulleys (not shown) for controlling and driving the belts in their return path to the inlet end of the runs 1, 2. The arrangement of the pulleys and the inlet end of the coneyor may be as described in U.K. Specification No. 2170164. Similarly, as described in that specification, the non-operative sides of the belts 2,3 are toothed for positive drive and, over the length of the runs 1, 2, are supported by elongate support members 9 each extending the full length of each run 1, 2 and each of which has an upturned lip 10 which will contact the lower portion of the periphery of a biscuit when in a near vertical attitude, as described in, and for reasons set out in, U.K. Specification No. 2170164.

The belt runs 1, 2 are symmetrically inclined to the vertical and, over at least the majority of the length of the runs 1, 2 the belts 3, 4 have a constant inclination to the vertical and preferably have an included angle of about 90°, the angle being selected in dependence on the angle of inclination it is desired or preferred for contacting groups of biscuits to assume, although it should be noted that this angle will vary in dependence on the density or spacing of biscuits on the conveyor. In end portion 11 at the outlet end of the biscuit path 5, the included angle defined by the belts 3, 4 increases progressively. This has the effect of permitting biscuits 6 of contacting groups of biscuits moving along this portion 11 of path 5 to progressively decline, the included angle at the outlet being such as to allow the biscuits to assume an attitude substantially parallel to the supporting surface defining the biscuit path of a further conveyor 12 for removing the biscuits individually from the end of biscuit path 5. As shown, conveyor 12 is an endless conveyor comprising a belt 13 provided with flights 14 for engaging behind a biscuit to remove it from the end of biscuit path 5. The operative run of conveyor 12 extends upwardly between belts 3, 4 in order to pick up biscuits from path 5 as they approach the end of runs 1, 2. It will, however, be appreciated that conveyor 12 may take other forms. For example it may be in the form of a drum with flights corresponding to flights 14 or recesses in which biscuits are received. Under such circumstances the terminal attitude of a biscuit in path 5 is then substantially tangential to the surface of the drum at the pick up point.

In operation of the above described system, it will be appreciated that the rate of advance of conveyor 12 must be selected relative to the rate of advance of belts 3, 4 to ensure that a biscuit is in position at the end of path 5 ready to be picked up by the next succeeding flight 14 before the flight arrives at the pick up point.

Figure 4:
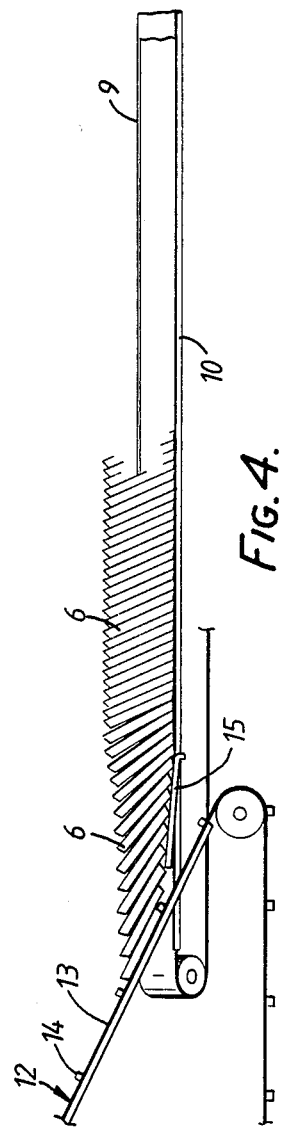
FIG. 4 is a view taken on the line IV—IV of FIG. 3.

Another embodiment is shown diagrammatically in FIGS. 3, 4 and 6 and like reference numerals are used in this embodiment for parts corresponding to parts of the embodiment, of FIGS. 1, 2 and 6. In this embodiment, the included angle of belts 3, 4 in runs 1, 2, remains constant throughout the length of the path 5. In order to decrease the angle of inclination to the horizontal of the biscuits 6 towards the outlet end of path 5 and to bring them into the correct attitude for pick-up by conveyor 12. A support element 15 is arranged in the region immediately upstream of the pick up point of conveyor 12. The member 15, which may, as shown, be in the form of a bar having, for example, a round section, and positioned centrally between the runs 1,2, is arranged to extend upwardly towards the end of path 5 into a lower part of path 5 of biscuits moving towards conveyor 12. Thus, the trailing lower edge of a biscuit travelling towards conveyor 12 will contact member 15 and the biscuit will be caused to progressively decline. The amount by which member 15 extends into the path of the biscuits at the pick up point of conveyor 12 is arranged so as to provide each biscuit with the required attitude relative to conveyor 12 at the pick up point for conveyor 12.

In relation to the above two embodiments, it is found that the selection of the form of the attitude changing means at the outlet end of the runs 1, 2 depends on characteristics of the article being conveyed by the conveyor. For articles which will pivot freely on belts 3, 4 i.e. have a relatively smooth periphery, the arrangement of FIGS. 1 and 2 is preferred. Where the periphery of the article is relatively rough it may be found that, because of frictional interaction between the article and the belts 3, 4, the article will not decline using the embodiment of FIGS. 1 and 2. Under such circumstances the embodiment of FIGS. 3 and 4 can be used because the member 15 positively causes declination of the article whereas the embodiment of FIGS. 1 and 2 essentially permits declination of the article. However, use of the support 15 has the disadvantage that the article bears on the member with a degree of pressure depending on the weight of the article. For articles wth very fragile peripheries, this can be a disadvantage. Under such circumstances, it may be advantageous to combine the attitude changing means of both the above embodiments. Such an arrangment is shown in FIGS. 5, in which like reference numerals are used for like parts. Thus in this embodiment, in the end portion 11 of runs 1, 2 the included angle between the belts 3, 4 progressively increases in the direction of the outlet end of the path 5 as in the embodiment of FIGS. 1 and 2. Additionally, immediately adjacent and upstream of the pick up point of conveyor 12 a support member 15 is provided, as in the embodiment of FIGS. 3 and 4.

However, in this embodiment, the included angle between the belts 3, 4 may not be increased to quite the same extent that it would need to be were belt inclination the sole attitude changing means, because member 15 itself positively contributes towards changing the attitude of the articles. However, because the included angle between the belts is increased, the pressure exerted by member 15 on the peripheries of the articles 5 will be reduced.

The embodiment of FIG. 5 also includes a further modification which is also applicable to both of the embodiments of FIGS. 1 and 2 and 3 and 4. This modification is that the belts 3, 4 are progressively spaced apart towards the outlet end of path 5. The reason for this is simply to increase the space between the belts 3, 4 for the conveyor 12 and is required where the conveyor 12 has a width greater than the minimum spacing of the belts 3, 4 over the remainder of the path 5. In this region the lips 10 may need to be reduced so as not to interfere with the effect of member 15.

It will be appreciated that the member 15, where provided, may take other forms. For example, two support members may be provided spaced apart across the width of the gap between belts 3, 4. Alternatively its function could be provided by appropriate shaping of the lips 10 (FIG. 6). This modification would simply involve increasing the extent of the lips 10 so that they project into the path 5 to the extent required to effect the further declination of the articles in the path. This modification to the lips 10 would of course be a local modification provided only in the region in which member 15 is, as shown, provided.

In use of the above conveyor system, particularly with articles which have relatively rough faces, the articles may have a tendency to stick together and will tend therefore not to change their inclination at the outlet end of the conveyor. To prevent this occurring, it has been found useful, immediately upstream of the outlet end, to provide a section of the conveyor in which the articles are cuased to move relative to each other. This can be achieved by providing a surface in the region of the lower part of the article path which undulates into and out of the path. The surface may be provided by a bar positioned centrally between the belts of the conveyor or by appropriate shaping of the lips 10 associated with the belts, as shown in FIG. 7. The effect of this on the inclination of articles passing through this section of the conveyor is that, where the lips or bar extend into the article path, the articles will tend to decline so that there is movement between adjacent articles.

While the conveyor system described above has been described in terms of a system for conveying biscuits, it will be appreciated that the system can be used with a wide variety of articles which are generally planar and preferably have a regular shape in plane

What is claimed is:

1. A method of conveying relatively planar articles along a first path defined by a first conveyor having a pair of walls, and then along a further path defined by a further conveyor extending upwardly from the outlet end of the first path comprising inclining the walls of said first conveyor to the vertical so that the operative surfaces of said walls face one another with the lower edges of said walls closer to each other than the upper edges to define between said walls an included angle, retaining the incline of the walls of the first conveyor symmetrically of a substantial part of said first path so that said incline angle is substantially constant over said substantial part of said first path, arranging said articles on the first conveyor with their peripheries engaging said walls and with at least two thereof in contact with a predetermined forward angle of tilt as determined by said substantially constant included angle, and thereafter progressively increasing the forward angle of tilt of said articles in the region of said outlet by progressively increasing the inclination of said walls to the vertical in the region of said outlet to increase said included angle between said walls whereby said articles are tilted further forward in response to said increase in said included angle.

2. A method as claimed in claim 1 including further increasing the angle of tilt of said articles in a forward direction by extending support means into said first path in the region of said outlet end and in a position to be contacted by a lower portion of the periphery of each article.

3. The method as claimed in claim 1 including effecting relative movement between adjacent articles while still on said substantial part of said first path to prevent sticking and subsequent failure of said articles to tilt further in the region of said outlet in response to said increase in said included angle.

4. A conveyor system for conveying relatively planar articles comprising a first conveyor comprising a pair of runs of endless belts having operative surfaces defining therebetween a first path for the articles, said operative surfaces facing one another and being relatively inclined to the vertical so that the lower edges of said belt runs are closer to each other than are the upper edges and such that an article conveyed thereby will make contact by its periphery with the operative surfaces of the runs and, when at least two articles in the article path are in contact, will assume an inclined attitude, and attitude changing means provided in the region of the outlet end of said article path for reducing the angle of inclination to the horizontal of articles at said outlet end of said path, said belt runs being inclined symmetrically to the vertical and defining an included angle therebetween which, over a substantial part of said first path, is substantially constant, and said attitude changing means comprising an end portion of said first path adjacent the outlet end thereof in which said included angle defined by said belt runs is increased so as to permit the angle of inclination to the horizontal of articles to decrease.

5. A conveyor system as claimed in claim 4, wherein said further path of said further conveyor intersects said first path at the outlet end thereof.

6. A conveyor system as claimed in claim 5, wherein the spacing of said belts runs of said first conveyor is increased in the region of said outlet end of said first path to accomodate said further conveyor.

7. A conveyor system as claimed in claim 4, comprising stationary support means extending along and adjacent the lower edge of each belt run for contacting the periphery of an article in the first path when the angle of inclination to the horizontal of the article increases to a preset angle, wherein, adjacent but upstream of the outlet end portion of the first path, said stationary support means are shaped to project into said first path to be contacted by an article whose angle of inclination to the horizontal is less than said preset angle.

8. A conveyor system as claimed in claim 4, wherein said further path of said further conveyor is generally linear.

9. A conveyor system as claimed in claim 4, wherein in said end portion of said first path said included angle defined by said belt runs increases progressively in the direction of said outlet end thereof.

10. A conveyor system as claimed in claim 4, comprising a further conveyor extending from said outlet end of said first path of said first conveyor and there defining a further path for articles which extends upwardly from said outlet end of the first path and is inclined thereto, said attitude changing means being arranged to cause or permit each article at said outlet end of said first path to assume an attitude in which it is substantially parallel to said further path.

11. A conveyor system as claimed in claim 4, wherein said attitude changing means also comprises support means which extends into said first path in the region of said outlet end thereof so as to be contacted by a lower portion of the periphery of an article in said first path.

12. A conveyor system as claimed in claim 11, wherein said support means extends into said first path to an extent which increases in the direction of said outlet end thereof.

13. A conveyor system as claimed in claim 12, wherein said support means comprises an elongate member which is positioned centrally between said runs of said belts and extends in the direction of said first path.

* * * * *